(12) United States Patent
Wu

(10) Patent No.: US 9,915,459 B2
(45) Date of Patent: Mar. 13, 2018

(54) USE OF THERMOELECTRIC ELEMENTS FOR CLEAR ICE MAKING, ICE HARVESTING, AND CREATING A TEMPERATURE CONDITION FOR CLEAR ICE MAKING

(71) Applicant: Whirlpool Corporation, Benton Harbor, MI (US)

(72) Inventor: Guolian Wu, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 217 days.

(21) Appl. No.: 14/673,979

(22) Filed: Mar. 31, 2015

(65) Prior Publication Data

US 2016/0265832 A1    Sep. 15, 2016

Related U.S. Application Data

(60) Provisional application No. 62/130,066, filed on Mar. 9, 2015.

(51) Int. Cl.
*F25B 21/02* (2006.01)
*F25C 1/18* (2006.01)
*F25B 21/04* (2006.01)

(52) U.S. Cl.
CPC .............. *F25C 1/18* (2013.01); *F25B 21/04* (2013.01); *F25B 2321/0251* (2013.01); *Y02P 60/855* (2015.11)

(58) Field of Classification Search
CPC .............. F25C 1/18; F25C 1/12; F25B 21/04
See application file for complete search history.

(56) References Cited

U.S. PATENT DOCUMENTS

| | | | |
|---|---|---|---|
| 6,427,463 B1 * | 8/2002 | James | F25B 5/04 62/186 |
| 6,735,959 B1 * | 5/2004 | Najewicz | F25C 1/04 62/3.63 |
| 6,951,113 B1 * | 10/2005 | Adamski | F25B 21/04 62/233 |

(Continued)

FOREIGN PATENT DOCUMENTS

| | | |
|---|---|---|
| EP | 1821051 A1 | 8/2007 |
| EP | 2743608 A2 | 6/2014 |
| JP | H04161774 A | 10/1992 |

(Continued)

OTHER PUBLICATIONS

Machine Translation of JP 2001041624 A; Mogi, Junichi; Feb. 2001.*

(Continued)

*Primary Examiner* — Frantz Jules
*Assistant Examiner* — Steve Tanenbaum
(74) *Attorney, Agent, or Firm* — Nyemaster Goode, P.C.

(57) ABSTRACT

An ice making apparatus for an appliance includes a housing that has an interior volume and an ice tray horizontally suspended across the interior volume that is configured to retain water. The ice making apparatus also includes a heat pump thermally coupled to a bottom surface of the ice tray. The heat pump is configured to freeze water in the ice tray and expel heat. A heat transfer device is configured to move heat expelled by the heat pump to an upper portion of the interior volume.

16 Claims, 6 Drawing Sheets

(56) References Cited

U.S. PATENT DOCUMENTS

2006/0168983 A1    8/2006  Tatsui et al.
2010/0251744 A1*  10/2010  Yun ...................... F25D 17/065
                                                              62/340

FOREIGN PATENT DOCUMENTS

| JP | 2001041624 | A | * | 2/2001 |
| JP | 2002139268 | A | * | 5/2002 |
| JP | 2005164145 | A |   | 6/2005 |
| JP | 2005195315 | A |   | 7/2005 |
| SU | 1747821    | A1 |  | 7/1992 |

OTHER PUBLICATIONS

Aoki (JP2002139268), machine translation from the European Patent Office.*
International Searching Authority, "Search Report & Written Opinion," issued in connection with International Patent Application No. PCT/US2016/021499, dated Jun. 6, 2016, 7 pages.
European Patent Office, "European Search Report," issued in connection with European Patent Application No. 13194679.0, dated Dec. 7, 2016, 10 pages.
International Searching Authority, "International Preliminary Report on Patentability & Written Opinion," issued in connection with International Patent Application No. PCT/US2016/021499, dated Sep. 21, 2017, 6 pages.

* cited by examiner

USE OF THERMOELECTRIC ELEMENTS FOR CLEAR ICE MAKING, ICE HARVESTING, AND CREATING A TEMPERATURE CONDITION FOR CLEAR ICE MAKING

CROSS-REFERENCE TO RELATED APPLICATIONS

This application claims benefit of U.S. Provisional Application Ser. No. 62/130,066, filed Mar. 9, 2015, entitled USE OF THERMOELECTRIC ELEMENTS FOR CLEAR ICE MAKING, ICE HARVESTING, AND CREATING A TEMPERATURE CONDITION FOR CLEAR ICE MAKING, the entire contents of which are incorporated herein by reference.

FIELD OF THE INVENTION

The present invention generally relates to an ice maker for making substantially clear ice pieces, and methods for the production of clear ice pieces. More specifically, the present invention generally relates to an ice maker and methods which are capable of making substantially clear ice without the use of a drain.

BACKGROUND OF THE INVENTION

During the ice making process when water is frozen to form ice cubes, trapped air tends to make the resulting ice cubes cloudy in appearance. The trapped air results in an ice cube which, when used in drinks, can provide an undesirable taste and appearance which distracts from the enjoyment of a beverage. Clear ice requires processing techniques and structure which can be costly to include in consumer refrigerators and other appliances. There have been several attempts to manufacture clear ice by agitating the ice cube trays during the freezing process to allow entrapped gases in the water to escape.

SUMMARY OF THE INVENTION

According to one aspect of the present invention, an ice making apparatus for an appliance that includes a housing surrounding an interior volume and an ice tray horizontally suspended across the interior volume and configured to retain water. The ice making apparatus also includes a thermoelectric device having a cold side and a hot side, the cold side thermally coupled to a bottom portion of the ice tray. An air movement device is configured to circulate air within the interior volume such that the air transfers heat from the hot side of the thermoelectric device to an upper portion of the ice tray.

According to another aspect of the present invention, an ice making apparatus for an appliance includes a housing that has an interior volume and an ice tray contained with the interior volume and configured to retain water. A heat pump is thermally coupled to a bottom surface of the ice tray. The heat pump is configured to expel heat away from the bottom surface and freeze water in the ice tray. The ice making apparatus also includes a heat transfer device which is configured to move heat expelled by the heat pump to an upper portion of the interior volume for forming at least one substantially clear ice piece within the ice tray.

According to another aspect of the present invention, a method includes steps of providing an appliance with an ice maker housing that has an interior volume and providing an ice tray suspended within the interior volume. The ice tray has reservoirs containing water and a bottom surface thermally coupled to a thermoelectric device. The method also includes transferring heat from the bottom surface of the ice tray across the thermoelectric device to air below the ice tray within the interior volume. In addition, the method includes circulating the air such that heat from the bottom surface is transferred to a top surface of the water forming substantially clear ice pieces in the ice tray.

These and other features, advantages, and objects of the present invention will be further understood and appreciated by those skilled in the art by reference to the following specification, claims, and appended drawings.

DETAILED DESCRIPTION

Before the subject invention is described, it is to be understood that the invention is not limited to the particular embodiments described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

Figure 2:
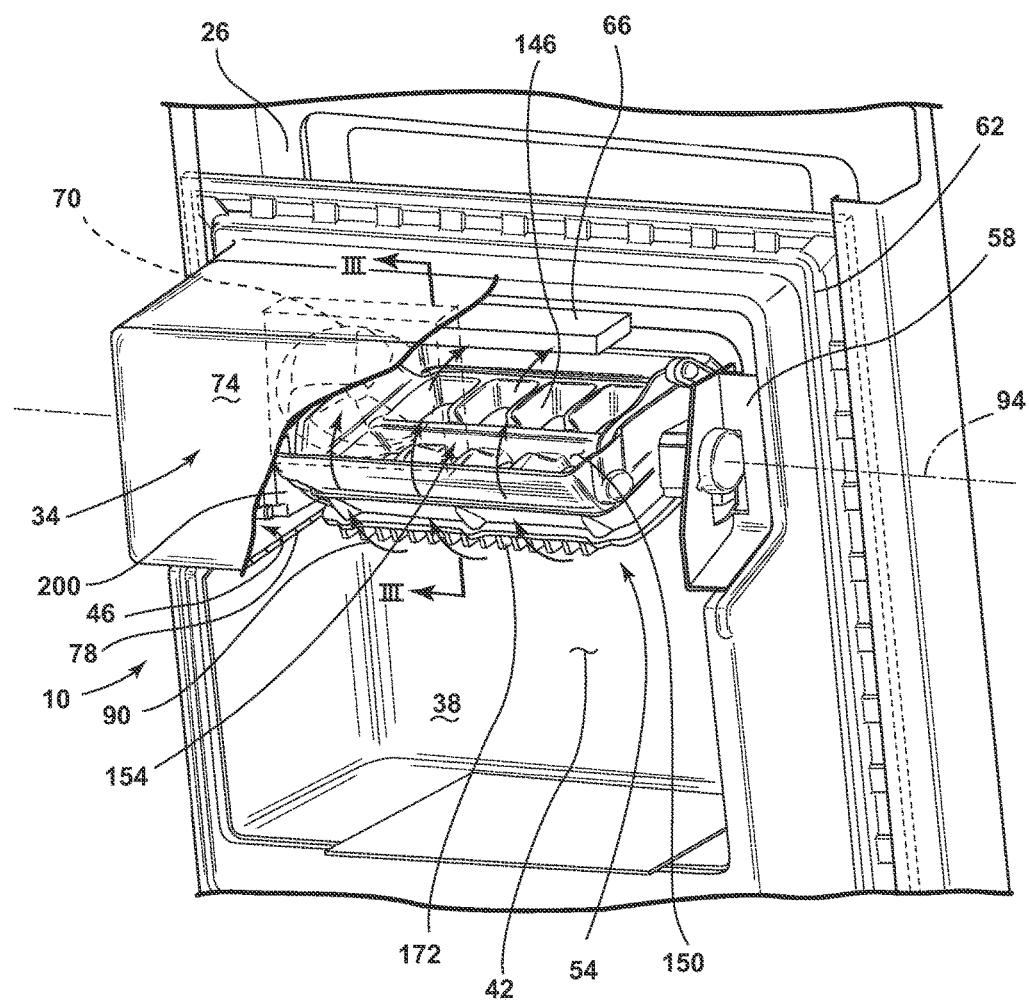
FIG. 2 is a top perspective view of an appliance door showing the ice making apparatus with a housing cutaway to expose an ice tray, according to one embodiment.

For purposes of description herein, the terms "upper," "lower," "right," "left," "rear," "front," "vertical," "horizontal," and derivates thereof shall relate to an ice making apparatus 10 as oriented in FIG. 2, unless stated otherwise. However, it is to be understood that the ice making apparatus may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
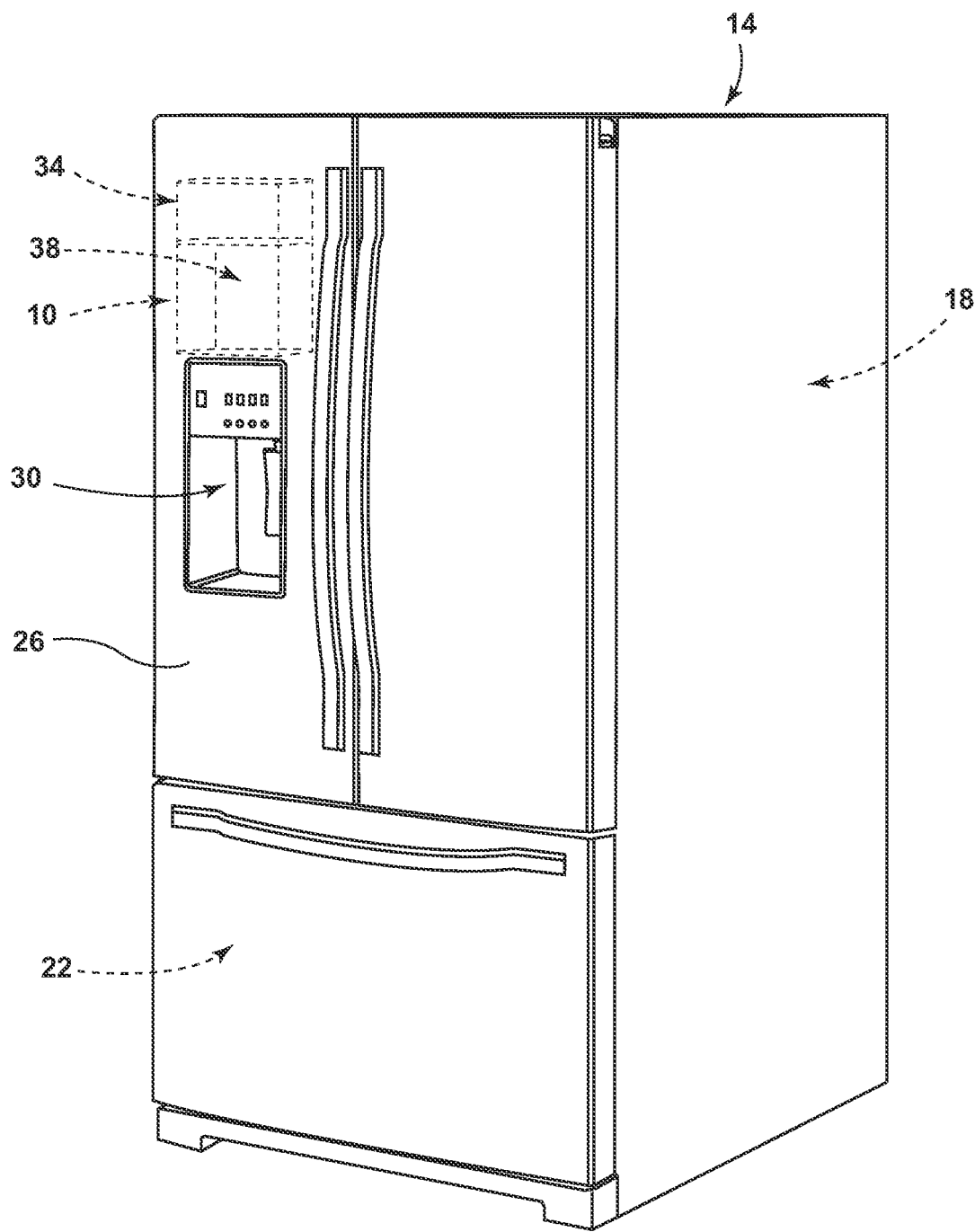
FIG. 1 is a front perspective view of a refrigerating appliance incorporating an ice making apparatus, according to one embodiment.

Referring now to FIG. 1, one embodiment of an ice making apparatus 10 is generally disposed within a door 26 of a refrigerating appliance 14, generally referred to as a French door refrigerating appliance. In the illustrated embodiment, the ice making apparatus 10 is located above an ice dispenser 30 on the door 26 to facilitate dispensing ice from an ice cube storage container 38 (FIG. 2) of the ice making apparatus 10 without opening the door 26. In certain embodiments, the ice making apparatus 10 can be near one of a refrigerating compartment 18 or a freezer compartment 22 of the refrigerating appliance 14. However, additional embodiments of the ice making apparatus may be included in the door of a differently configured refrigerating appliance, such as a side-by-side refrigerating appliance, in an alternative location within a refrigerating and/or freezer appliance, and within a dedicated ice maker appliance.

Referring now to FIG. 2, in the depicted embodiment the ice making apparatus 10 includes an ice maker housing 34 disposed inside of an ice cube storage container 38. The ice cube storage container 38 includes a storage space 42 which may store ice pieces until needed. An interior volume 46 of the ice maker housing 34 communicates with the storage space 42 of the ice cube storage container 38, which in turn communicates with the ice dispenser 30, such that ice formed in the ice maker housing 34 can be removed from the outside surface of the door 26. Accordingly, the ice maker housing 34, although shown partially cutaway, surrounds the interior volume 46 and provides openings to allow communication for the passing of ice pieces.

Referring again to FIG. 2, according to the depicted embodiment, an ice tray 54 is horizontally suspended across and pivotally coupled to stationary support members 58 within the ice maker housing 34. The ice cube storage container 38 and housing 34 may be integrally formed with a door liner 62 of the door 26 or may be separate components. Located within the ice maker housing 34 is a thermal storage element 66, and an air movement device 70. The ice maker housing 34 includes a body portion 74, an opening 76 (FIG. 5), and a door 78 connected with a hinge 82 (FIG. 3) permitting the housing 34 to open via the door 78 rotating away from the body portion 74. Opening of the housing 34 allows communication between the interior volume 46 of the housing 34 and the storage space 42 of the ice cube storage container 38 such that clear ice pieces 50 formed in the ice tray 54 may fall into the storage space 42.

Still referring to FIG. 2, air 90 within the interior volume 46 of the ice maker housing 34 is circulated via the air movement device 70. In other embodiments, the air movement device 70 moves or replaces air in the housing 34. The air movement device 70 may include a conventional fan, a bladeless fan, structures promoting natural circulation, and/or other known methods and structures of moving air. The ice maker housing 34 may employ a single air movement device 70 or a plurality of air movement devices 70 configured to move the air 90 in a predetermined flow path. In one exemplary embodiment, the ice maker housing 34 includes a plurality of air movement devices 70 disposed within the interior volume 46 of the housing 34 configured to circulate the air 90 in a circular motion around an axis 94 of the ice tray 54. In other embodiments, the air movement device 70 may be configured to circulate the air 90 parallel to the axis 94 of the ice tray 54.

Figure 3:
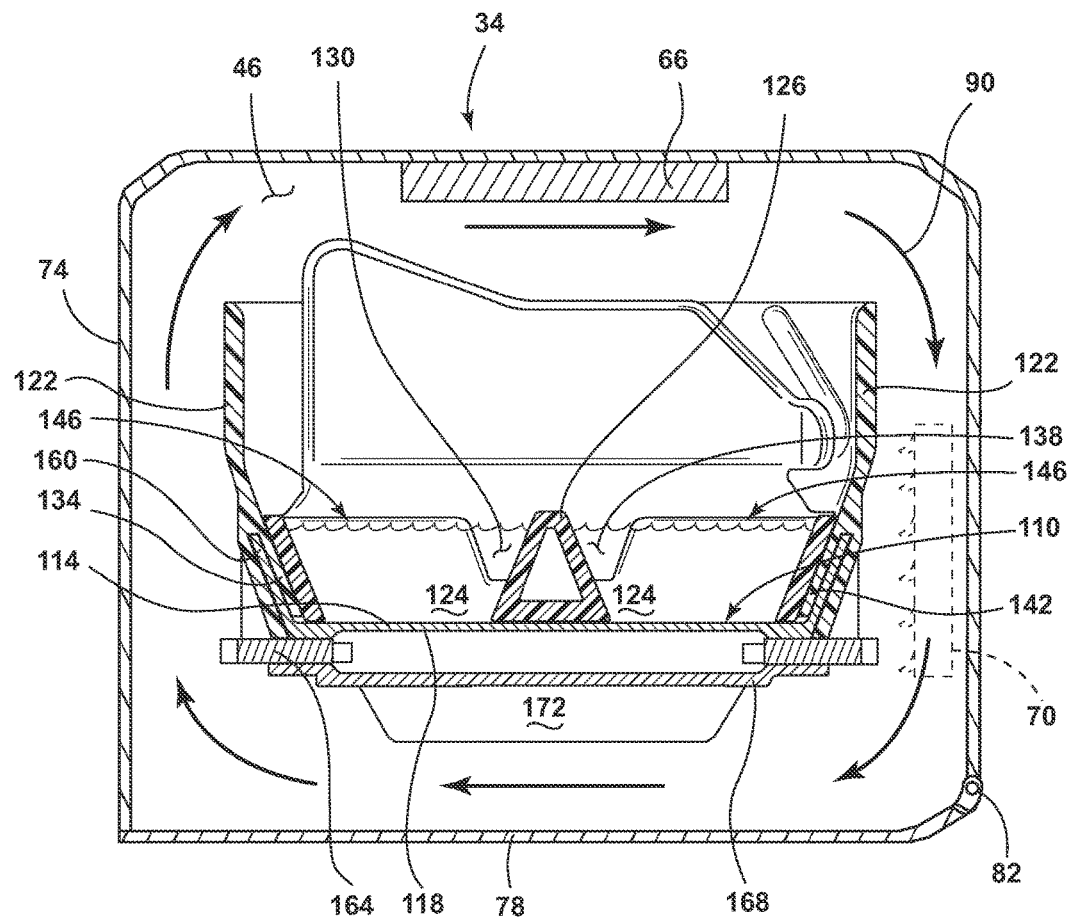
FIG. 3 is a cross-sectional side view of the ice making apparatus of FIG. 2, taken along line III-III.

In the depicted embodiment of FIG. 3, the ice tray 54 includes an ice forming plate 110 with a top surface 114 and a bottom surface 118. The ice forming plate 110 is a conductive material, such as metal. For example, a zinc-alloy, which is corrosion resistant and suitably thermally conductive, may be used in the ice forming plate 110. A containment wall 122 surrounds the top surface 114 of the ice forming plate 110 and extends upwards around the periphery thereof. The containment wall 122 is configured to retain water 124 on the top surface 114 of the ice forming plate 110. In one embodiment, the refrigeration appliance 14 has a water system capable of dispensing the water 124 into the ice tray 54. In another embodiment, a user of the refrigeration appliance 14 may fill the ice tray 54 externally of the refrigeration appliance 14. A median wall 126 extends orthogonally from the top surface 114 of the ice forming plate 110 parallel to the axis 94 of the ice tray 54, dividing the ice tray 54 into at least two reservoirs 130, 138. A first reservoir 130 is defined between the median wall 126 and a first sidewall 134 of the containment wall 122. A second reservoir 138 is defined between the median wall 126 and a second sidewall 142 of the containment wall 122, which is generally opposing the first sidewall 134 of the containment wall 122.

Dividing walls 146 extend generally orthogonally from the top surface 114 of the ice forming plate 110 and generally perpendicularly to the median wall 126. These dividing walls 146 further separate the ice tray 54 into an array of individual compartments 150 for the formation of clear ice pieces 50. The compartments 150 are generally square in the embodiment depicted in FIGS. 2-3, with inwardly and downwardly extending sides to facilitate harvesting of the clear ice pieces 50. A grid 154 is provided which forms the median wall 126 and the dividing walls 146. The grid 154 is separable from the ice forming plate 110 and the containment wall 122, and is preferably resilient and flexible to facilitate harvesting of the clear ice pieces 50. Although the depiction shown in FIGS. 2 and 3 includes one median wall 126 with two rows of compartments 150, two or more median walls 126 could be provided in additional embodiments. Similarly, although eight individual compartments 150 are depicted, other embodiments of the ice tray 54 may include more or less dividing walls 146 to increase or decrease the number of individual compartments 150.

Referring again to the depicted embodiment of FIG. 3, the ice forming plate 110 has upwardly extending edges 160 around its exterior, and the containment wall 122 is integrally formed over the upwardly extending edges 160 to form a water-tight assembly, with the upwardly extending edge 160 of the ice forming plate 110 embedded within the lower portion of the containment wall 122. In one embodiment, the containment walls 122 are an insulative material, including, without limitation, plastic materials, such as polypropylene. The containment wall 122 may be molded over the upwardly extending edges 160 of the ice forming plate 110, such as by injection molding, to form an integral part with the ice forming plate 110 and the containment wall 122. However, other methods of securing the containment wall 122 include, without limitation, mechanical engagement or an adhesive. The containment wall 122 may diverge outwardly from the ice forming plate 110, and then extend in an upward direction, which is substantially vertical.

Still referring to FIG. 3, a heat pump (e.g., a thermoelectric device 164 or compression cycle systems) is physically affixed and thermally connected to the bottom surface 118 of the ice forming plate 110 to cool the ice forming plate 110, and thereby cool water 124 is added to the top surface 114 of the ice forming plate 110. The thermoelectric device 164, as illustrated, is coupled to a heat sink 168 and transfers heat from the bottom surface 114 of the ice forming plate 110 to the heat sink 168 during formation of clear ice pieces 50. One example of such a device is a thermoelectric plate which can be coupled to a heat sink 168, such as a Peltier-type thermoelectric cooler. In additional embodiments, the thermoelectric device 164 may be thermally coupled to the heat sink 168 through conductive materials or through the air 90. In certain embodiments, the ice forming plate 110 can be formed directly by the thermoelectric device 164, and in other embodiments the ice forming plate 110 is thermally linked with the thermoelectric device 164. The heat sink 168 includes fins 172 to facilitate transfer of thermal energy from the heat sink 168 to the air 90. In the depicted embodiment, the fins 172 are perpendicular to the median wall 126, but may take other configurations depending on the desired flow path of air 90 within the housing 34. The heat sink 168 comprises a conductive material which has a high heat capacity, such as a metal. For example, the heat sink 168 may comprise copper, silver, or other similar metals.

With further reference to FIG. 3, the thermal storage element 66 is configured to absorb and release thermal energy from the air 90 with the housing 34. In the depicted embodiment, the thermal storage element is disposed along an inner surface of the body portion 74 of the housing 34 directly above the ice tray 54. In some embodiments, the thermal storage element 66 may be suspended within the interior volume 46 or may be disposed beside or under the ice tray 54 within the housing 34. The ice making apparatus 10 may include a single unitary thermal storage element 66, as depicted in FIG. 3, or may include a plurality of thermal storage elements 66 which may be disposed at various locations throughout the interior volume 46. Additionally or alternatively, the thermal storage element 66 may be porous, include airflow paths, and/or fins to maximize the surface area contacting the air 90 within the housing 34. In embodiments where the thermal storage element 66 is in contact with the housing 34, there may be an insulative material disposed between the thermal storage element 66 and the housing 34. In one embodiment, the thermal storage element 66 includes a material which undergoes a phase transition above 0° Celsius. Exemplary materials include paraffin wax, metallic metals, alcohols, glycols, and refrigerants. In a further embodiment, the material of the thermal storage element 66 has a high heat capacity and a high heat transfer coefficient.

According to one embodiment, the ice making apparatus 10 employs varied thermal input to produce clear ice pieces 50 for dispensing. In another embodiment, the ice making apparatus 10 employs a rocking motion to produce clear ice pieces 50 for dispensing. In another, the ice making apparatus 10 uses materials of construction with varying conductivities to produce clear ice pieces 50 for dispensing. In another aspect, the icemaker 10 is a twist-harvest ice making apparatus 10. Any one of the above aspects, or a combination thereof, as described herein, may be used to promote the formation of clear ice.

Figure 4:
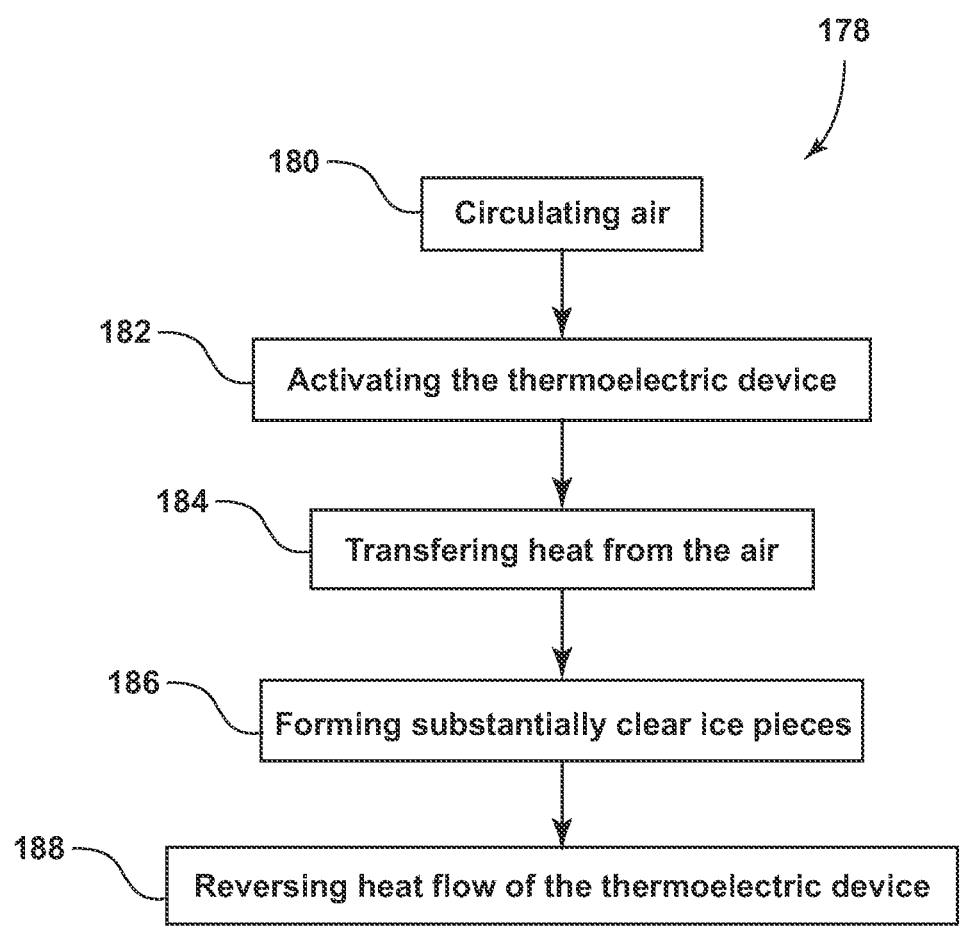
FIG. 4 is a flow chart of an ice making process, according to one embodiment.

Referring now to FIG. 4, according to one embodiment of a clear ice making process 178, thermal energy expelled by the thermoelectric device 164 may be used to heat the air 90 above the ice tray 54 to a temperature which is warmer than the temperature of the ice forming plate 110. In the depicted embodiment, the process 178 may be started with step 180 of circulating the air 90. As described above, the air movement device 70 circulates the air 90 within the interior volume 46 around the axis 94 of the ice tray 54. In another embodiment, the air 90 may be circulated along the length of the ice tray 54. Next, step 182 of activating the thermoelectric device 164 is performed. With respect to step 182, the activation of the thermoelectric device 164 causes the thermoelectric element 164 to begin transferring thermal energy from the bottom of the ice tray 54 to the heat sink 168. As the air 90 is circulating below the ice tray 54, it passes over the fins 172 of the heat sink 168 and is warmed by absorbing thermal energy expelled from the thermoelectric device 164.

Referring again to FIG. 4, the circulation of the warmed air 90 allows step 186 of transferring heat from the air 90 to take place. As the air 90 warmed by the heat sink 168 continues circulating around the interior volume 46, it passes over the ice tray 54 and thermal storage element 66. As the air 90 passes over the water 124 within the ice tray 54 it transfers heat to the water 124. The thermal energy transferred to the top of the water 124 creates a thermal gradient across the water 124 between the ice forming plate 110 and the air 90. The air 90 may be supplied over the ice tray 54 in a manner which is sufficient to cause agitation of the water 124 retained within the ice tray 54, allowing release of gases from the water 124, or may have generally laminar flow which affects the temperature above the ice tray 54, but does not agitate the water 124 therein. During circulation, the air 90 also passes over and transfers thermal energy to the thermal storage element 66. After expelling the thermal energy gained from the heat sink 168 and thereby cooling, the air 90 is circulated below the ice tray 54 to cool the heat sink 168 by absorbing heat expelled from the thermoelectric device 164.

With further reference to FIG. 4, steps 180-184 are performed and repeated until step 186 of forming substantially clear ice pieces 50 takes place. In the depicted embodiment, step 188 of reversing heat flow of the thermoelectric device 164 may be performed as explained in greater detail below. In other embodiments, step 188 is optional.

Generally, creating a thermal gradient in the water 124 while freezing results in directional solidification of the water 124 into the substantially clear ice pieces 50. Directional solidification occurs when ice crystals nucleate at a common point in the individual compartments 150 (e.g., at a bottom portion of the water 124), and grow in the same direction (e.g., toward the top of the water 124) until complete solidification of the water 124 has occurred. During directional solidification, the top of the water 124 remains liquid and allows trapped gasses to escape prior to complete solidification resulting in the substantially clear ice pieces 50.

According to one embodiment, the ice tray 54 may be rocked back and forth while the water 124 freezes to become the substantially clear ice pieces 50. Rocking aids in the formation of clear ice pieces 50 in that it causes the release of air bubbles from the liquid as the liquid cascades over the median wall 126 and also in that it encourages the formation of ice in successive thin layers, and, when used in connection with warm air flow, allows exposure of the surface of the clear ice pieces 50 to the warmer temperature air 90. For additional information regarding fabrication and utilization of rocking ice makers, refer to U.S. patent application Ser. No. 13/713,283 to Boarman et al., entitled "ICE MAKER WITH ROCKING COLD PLATE," filed Dec. 13, 2012 and U.S. patent application Ser. No. 13/713,199 to Boarman et al., entitled "CLEAR ICE MAKER WITH WARM AIR FLOW," also filed Dec. 13, 2012, which are incorporated herein by reference in their entirety.

Figure 5:
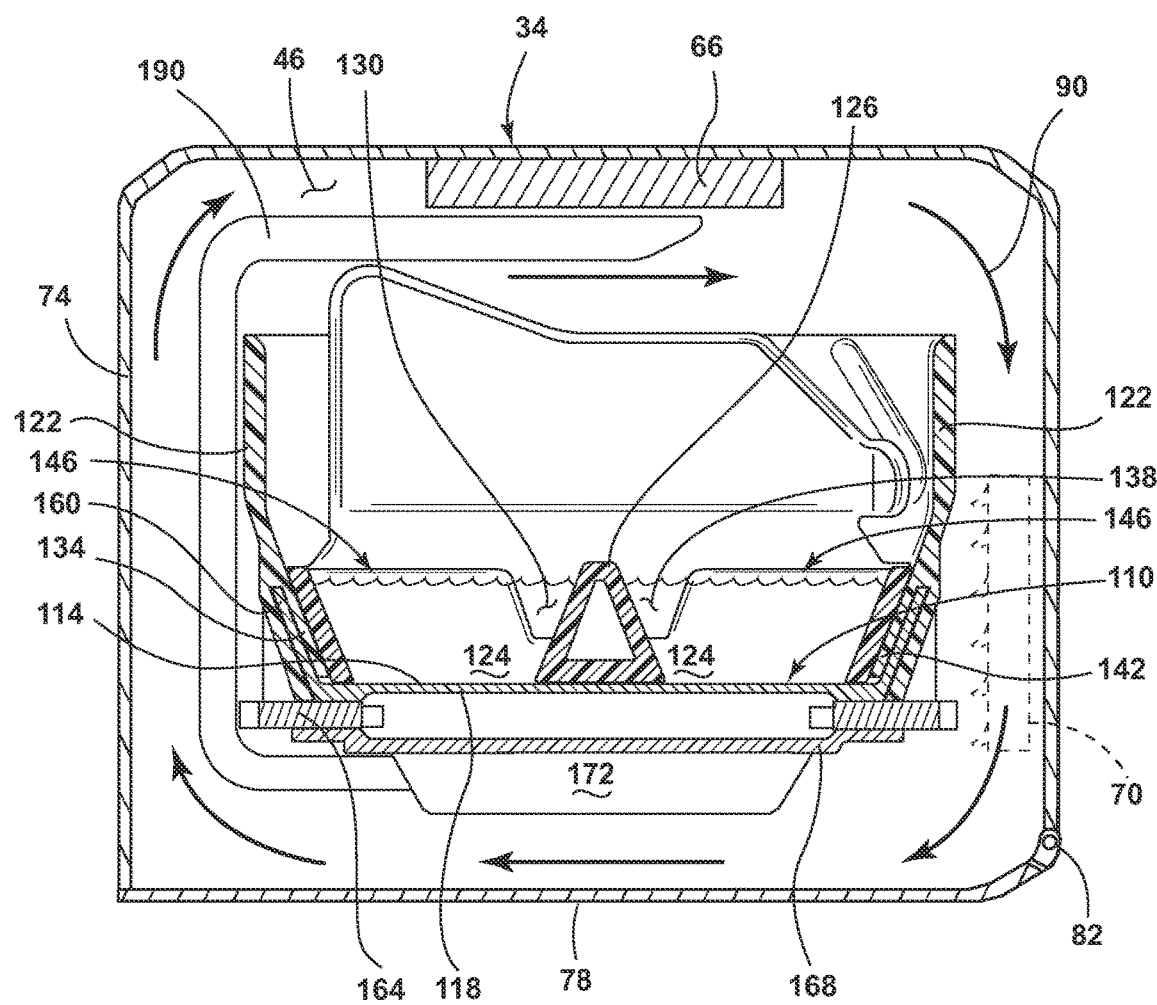
FIG. 5 is a cross-sectional side view of the ice making apparatus according to another embodiment.

Referring now to FIG. 5, an additional embodiment of the ice tray 54 includes a heat transfer device 190 thermally coupled to the heat sink 168. The heat transfer device 190 extends from the heat sink 168, around the ice tray 54, and is partially disposed above the reservoirs 130, 138. The ice tray 54 may include a single heat transfer device 190 or a plurality of devices 190 disposed over different portions of the ice tray 54. In yet another exemplary embodiment, the heat transfer device 190 is disposed above and extends parallel with the axis 94 of the ice tray 54. In yet another exemplary embodiment, a plurality of heat transfer devices 190 are disposed over the ice tray 54, each device 190 positioned over the dividing walls 146 of the grid 154 between the individual compartments 150. The heat transfer device 190 is configured to transfer thermal energy from the heat sink 168 to the air 90 above the reservoirs 130, 138 of the ice tray 54. The heat transfer device 190 may include a heat pipe, thermosiphon, or other passive and/or active heat transfer structures. Examples of heat pipes include vapor chambers, variable conductance heat pipes, pressure controlled heat pipes, and diode heat pipes.

In additional embodiments, the refrigeration appliance 14 may include an air intake and an air outlet such that the air 90 within the ice maker housing 34 is in communication with a space external to the refrigeration appliance 14. In such an embodiment, the air movement device 70 may draw air into the housing 34 through the air intake. The air 90 is then passed over the heat sink 168 and warmed. The warmed air 90 would be circulated through the housing 34 and across the water 124 in the ice tray 54 and then expelled through the air outlet. Such an embodiment has the advantage of warming air that is already at an external air temperature so as to provide a greater temperature gradient across the water 124 in the ice tray 54.

After formation of the substantially clear ice pieces 50 from the water 124, the ice 50 may be harvested. According to one embodiment of the clear ice making process 178, thermal energy expelled by the thermoelectric device 164 during the freezing process may be used to heat an interface between the ice forming plate 110 and the clear ice pieces 50 to facilitate easier harvesting. During operation of the ice harvesting process, the thermoelectric device 164 may reverse the flow of thermal energy such that heat is drawn from the air 90 through the heat sink 168 and transmitted to the ice forming plate 110 across the thermoelectric device 164. As residual heat in the heat sink 168 is removed, the heat sink 168 becomes cold and begins to absorb thermal energy from the circulating air 90. As the circulating air 90 passes over the heat sink 168 and cools to a temperature lower than the thermal storage element 66, the thermal storage element 66 releases thermal energy to the circulating air 90, thereby stabilizing the temperature of the air 90 above 0° Celsius and transferring heat to the heat sink 168. The thermal energy released by the thermal storage element 66 and absorbed by the heat sink 168 is then transferred across the thermoelectric device 164 to the ice forming plate 110. The transfer of thermal energy to the ice forming plate 110 warms the interface between the clear ice pieces 50 and the ice forming plate 110, thus facilitating harvesting of the pieces 50 from the tray 54. In embodiments utilizing the heat transfer device 190, the heat transfer device 190 may also function to absorb thermal energy from the air 90 and transfer it to the heat sink 168.

Figure 6:
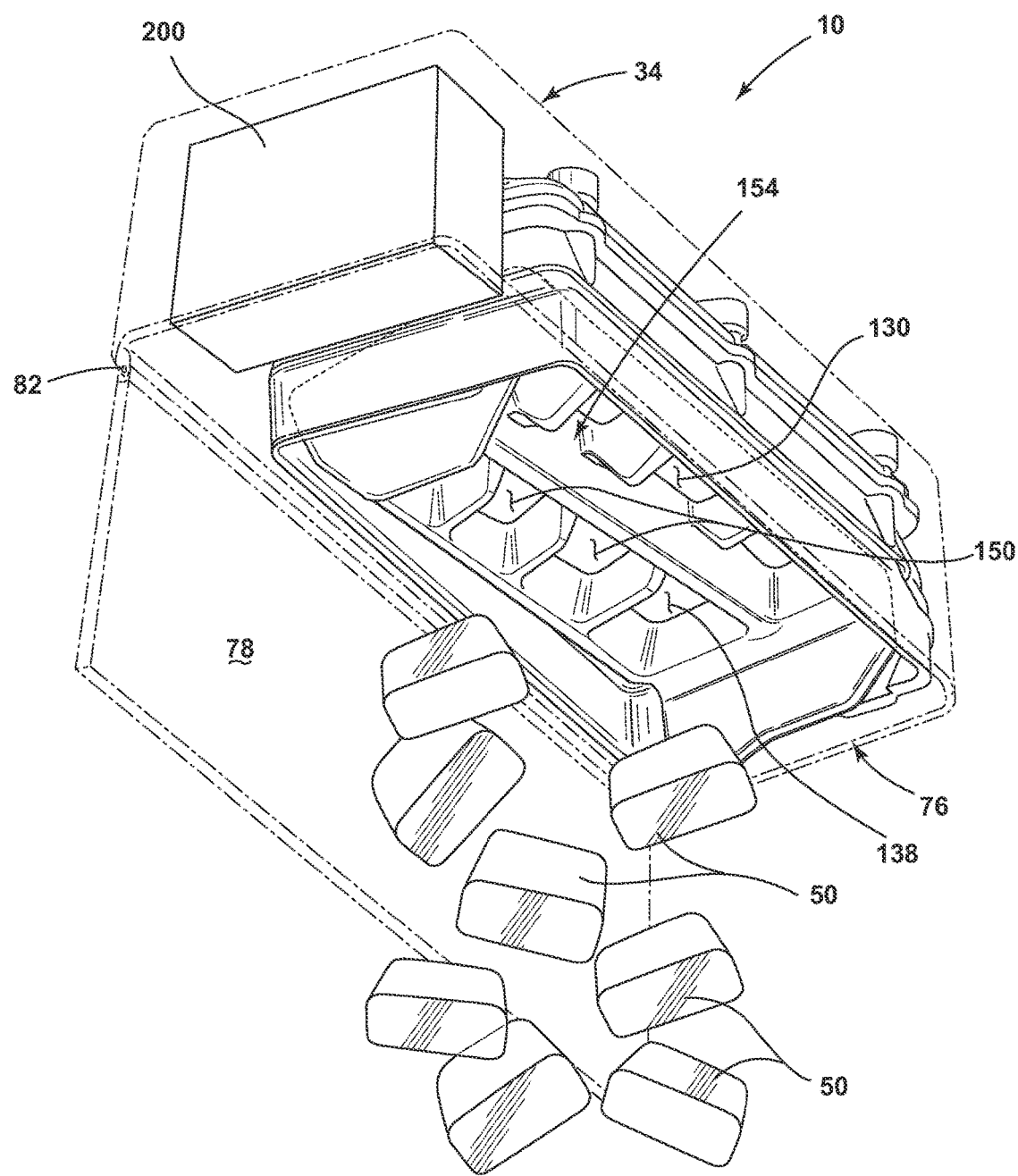
FIG. 6 is a bottom perspective view of an ice making apparatus in an inverted position.

Referring now to the depicted embodiment in FIG. 6, after the water 124 in the ice tray 54 has frozen to become the clear ice pieces 50 and the interface between the clear ice pieces 50 and ice forming plate 110 has been warmed, the ice tray 54 may be inverted to facilitate harvesting of the clear ice pieces 50. In such an embodiment the ice tray 54 is supported by and pivotally coupled to the stationary member 58 at one end and operably connected to a harvest motor 200 at another end. During harvesting of the clear ice pieces 50, the panel 78 may rotate away from the body portion 74 and into the ice cube storage container 38, thereby allowing communication between the interior volume 46 of the housing 34 and the ice cube storage container 38. In one embodiment, after the housing 34 has been opened, the harvest motor 200 rotates the ice tray 54 approximately 180°, such that the ice tray 54 is inverted and the clear ice pieces 50 may descend via gravity into the ice cube storage container 38. Alternatively, the harvest motor 200 may rotate the ice tray 54 prior to the panel 78 rotating away from the body portion 74. In another embodiment, the housing 34 may include upper and lower portions configured to rotate away from one another. In such an embodiment the housing 34 may rotate to provide an opening for the clear ice pieces 50 to enter the ice cube storage container 38 as the upper and lower portions rotate away from one another.

In one embodiment, the ice tray 54 may be a twist harvest ice tray 54. In such an embodiment, the ice making apparatus 10 may be configured to mechanically twist the ice tray 54 along the axis 94 such that the grid 154 is distorted. Distortion of the grid 154 may generate a stress on the substantially clear ice pieces 50 until they are released from the ice tray 54 and exit the housing 34 into the ice cube storage container 38. For additional information regarding fabrication and utilization of twist harvest ice makers, refer to U.S. patent application Ser. No. 13/713,228 to Boarman et al., entitled "TWIST HARVEST ICE GEOMETRY," filed Dec. 13, 2012, which is incorporated herein by reference in its entirety.

It will be understood by one having ordinary skill in the art that construction of the described invention and other components is not limited to any specific material. Other exemplary embodiments of the invention disclosed herein may be formed from a wide variety of materials, unless described otherwise herein. In this specification and the amended claims, the singular forms "a," "an," and "the" include plural reference unless the context clearly dictates otherwise.

Where a range of values is provided, it is understood that each intervening value, to the tenth of the unit of the lower limit, unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. An ice making apparatus for an appliance, comprising:
an ice maker housing configured to be attached to a door of a refrigerator, the housing surrounding an interior volume;
an icemaker within the ice maker housing comprising a stationary member disposed at a first end of the icemaker;
a motor disposed at a second end of the icemaker;
an ice tray horizontally suspended from the first end to the second end and configured to retain water;
the ice tray rotatable by the motor about an axis; and
a thermoelectric device coupled to and rotatable with the ice tray, the thermoelectric device having a cold side and a hot side, the cold side thermally coupled to a bottom portion of the ice tray, and the hot side thermally coupled to a heat sink;
a heat transfer device within the housing and thermally coupled to the heat sink;
an air movement device located within the ice maker housing;
the air movement device being located adjacent to the ice tray and the thermoelectric device;
the air movement device circulating air parallel to the axis of the ice tray and the thermoelectric device and directly toward the thermoelectric device; and
the air movement device being configured to circulate air within the interior volume, such that the air transfers heat from the hot side of the thermoelectric device to an upper portion of the ice tray.

2. The ice making apparatus of claim 1, wherein the heat transfer device is at least partially disposed both below and above the ice tray.

3. The ice making apparatus of claim 2, wherein the heat transfer device extends below, above, and along a side of the icemaker.

4. The ice making apparatus of claim 1, further comprising:
a thermal storage element disposed within the interior volume of the housing for stabilizing the air temperature within the housing.

5. The ice making apparatus of claim 4, wherein the thermal storage element is disposed above the ice tray.

6. The ice making apparatus of claim 4, wherein the thermal storage element comprises a material that undergoes a phase transition at a temperature above 0° Celsius.

7. The ice making apparatus of claim 4, wherein the thermal storage element is configured to absorb and expel heat such that the air temperature within the housing is stabilized above 0° Celsius.

8. An ice making apparatus for an appliance, comprising:
an ice maker housing for attachment to a door of a refrigerator, the housing having an interior volume;
an icemaker having a motor and an ice tray rotationally coupled to the motor contained within the interior volume and configured to retain water;
the ice tray having a horizontal axis;
a heat pump attached to and rotatable with the ice tray, the heat pump thermally coupled to a bottom surface of the ice tray, the heat pump configured to expel heat away from the bottom surface and freeze water in the ice tray; and
a heat transfer device disposed within the housing and thermally coupled to the heat pump, the heat transfer device configured to move heat expelled by the heat pump to an upper portion of the interior volume for forming at least one substantially clear ice piece within the ice tray;
an air movement device located within the ice maker housing; the air movement device being located adjacent to the ice tray and the heat pump;
the heat transfer device being thermally coupled to the heat pump, wherein the heat transfer device is at least partially disposed both below and above the ice tray.

9. The ice making apparatus of claim 8, further comprising:
a thermal storage element disposed within the internal volume of the housing.

10. The ice making apparatus of claim 9, wherein the thermal storage element comprises a material that undergoes a phase transition at a temperature above 0° Celsius.

11. The ice making apparatus of claim 9, wherein the material of the thermal storage element comprises at least one of a wax, a metal, and a refrigerant.

12. The ice making apparatus of claim 8, wherein the heat transfer device extends at least partially above, below and along a side of the ice tray.

13. The ice making apparatus of claim 8, wherein the heat transfer device at least partially encircles the ice tray.

14. The ice making apparatus of claim 8, wherein the air movement device circulates air within the internal volume.

15. A method comprising:
providing an appliance with an ice maker housing on a door of the appliance, the housing having an interior volume;
providing an ice tray having a horizontal axis suspended within the interior volume of the ice maker housing, the ice tray having reservoirs containing-water and a bottom surface thermally coupled to a thermoelectric device;
transferring heat from the bottom surface of the ice tray across the thermoelectric device to a heat transfer device within the housing and below the ice tray;
transferring heat from the heat transfer device to the air below the ice tray within the interior volume of the ice maker housing;
circulating the air from an air movement device located adjacent the ice maker and the thermoelectric device within the ice maker housing and circulating air parallel to the ice maker axis and the thermoelectric device, such that heat from the bottom surface of the ice tray is transferred to a top surface of the water;

forming substantially clear ice pieces in the ice tray;

harvesting the clear ice pieces by rotating the ice tray and thermoelectric device such that the clear ice pieces fall out of the ice tray by gravity.

16. The method of claim 15, further comprising:

transferring heat from the circulating air across the thermoelectric device to the bottom surface of the ice tray for releasing the substantially clear ice pieces from the tray; and providing a thermal storage element within the interior volume for stabilizing air temperature in an upper portion of the interior volume.

* * * * *